UNITED STATES PATENT OFFICE.

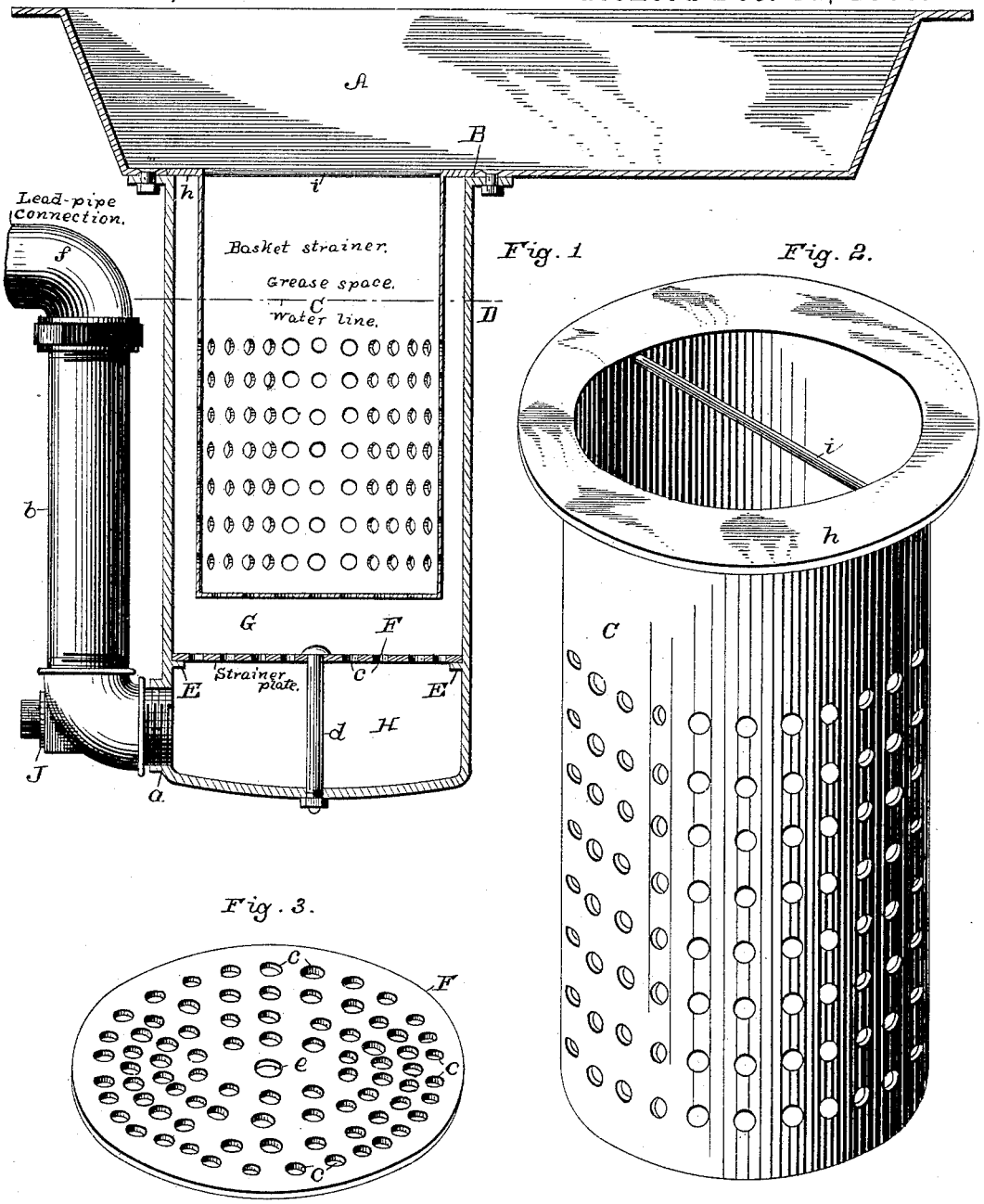

MICHAEL WILLIAM SCANNELL, OF KANSAS CITY, MISSOURI.

SINK-TRAP.

SPECIFICATION forming part of Letters Patent No. 394,213, dated December 11, 1888.

Application filed April 26, 1888. Serial No. 271,901. (No model.)

*To all whom it may concern:*

Be it known that I, MICHAEL WILLIAM SCANNELL, of Kansas City, Jackson county, Missouri, have invented a new and useful Improvement in Sink-Traps, of which the following is a full, clear, and exact description, reference being had to the accompanying drawings, forming a part hereof.

My invention relates to that class of sinks which are provided with removable strainers; and it consists of a shell attached to the lower part of the sink, said shell having a removable basket located therein, and a supplementary strainer interposed between the basket and the outlet orifice, in combination with other peculiarities and features more fully described hereinafter, and pointed out in the claims.

In the drawings, which illustrate the manner of carrying out my invention, Figure 1 is a vertical longitudinal section through the sink and trap, the waste-pipe connection being shown in elevation. Fig. 2 is a perspective view of a basket-strainer, enlarged, used in making up the invention; and Fig. 3 is a detail view in perspective of a stationary strainer-plate, also used in making up the invention.

The letter A indicates a sink of any ordinary size and shape, provided with a suitable opening or aperture, B, in its bottom for the reception of removable basket C.

D is the water trap or shell, open at its upper end, attached thereat to bottom of sink A by means of suitable coupling-bolts, and closed at its lower end, and which is provided with projections E on the lower portion of its inner surface, and upon which projections a stationary strainer-plate, F, is located, and which strainer-plate divides the interior of shell D into two chambers—an upper chamber, G, in which the basket C is located, and a lower chamber, H. Said stationary plate F is provided with perforations c and with a central perforation, e, through which a vertical bolt or rod, d, is passed, and which bolt passes through the bottom of shell D, and is provided with a screw-thread and nut at its lower end, or is secured to said bottom in some other suitable way.

On one side of chamber H is an internally-threaded connection, a, into which is screwed the iron waste-pipe b.

The upper end of waste-pipe b is provided with a lead-pipe connection, f, by means of which lead pipe may be used for waste-pipe in connecting the trap with a sewer. It is obvious, however, that I may dispense with iron pipe b and attach the lead pipe directly to connection a, if I so desire, giving the lead pipe an upward curve, so that it will be located as is the pipe b, and the operation will be substantially the same.

The vertical walls and bottom of basket C are perforated, as shown, for the passage of water, and the upper end of said basket is provided with an annular flange, h, which rests on upper end of shell D when said basket is in position for operation. Extending across the upper open end of said basket is a handle-rod, i, by means of which it may be lifted from the shell when required for cleaning, &c. The basket C is to be lifted from time to time and cleaned, and then dropped back into its place, which may be done in a few seconds and with less trouble than the cleaning out of common strainers by means of mops or brushes.

The outer shell, D, is preferably made of cast-iron. Should anything get into the trap by accident or be thrown in by careless persons while the basket-strainer C is out for cleaning, it cannot pass the lower or stationary strainer and can be easily removed with the hand. However, this is not likely to happen, as persons using the sink will find it so easy to dispose of the garbage when once in the basket that they will not turn the contents of same into the trap, for they would then have to remove it with the hand, as it cannot pass the lower strainer-plate.

J is a trap-screw opening at one side of pipe b, by means of which access may be easily had to lower chamber, H, whereby said chamber may be cleaned and sediment removed therefrom without disturbing stationary partition or strainer-plate F. This stationary perforated plate F and chamber H form an important feature of my invention, as they prevent careless or ignorant persons from choking up the waste-pipes, which can be done with other forms of sinks and traps, thereby making a great nuisance and expense to the owners, as they (the owners) in such cases are at the mercy of careless or designing persons.

In the common form of sink, which has simply a flat strainer on level with the bottom thereof, and which becomes clogged with the scrap in dish and other waste water, preventing the water from running off in sufficient volumes to entirely flush the trap and waste-pipe, and carrying what grease is contained in the water beyond reach, and leaving the other scraps exposed to view, and giving the sink a filthy appearance at all times, the grease and small particles of vegetable matter form a coating on the inside of the waste-pipes and trap, there to become putrid and throw off foul gases, which is well understood.

Such an arrangement as just described is very injurious to health, and in time will choke up the waste-pipe entirely, which necessitates the taking out of said waste-pipe, thereby exposing its foul contents to the atmosphere of the dwelling-house, and the accumulated filth is usually left somewhere about the premises, endangering the health of occupants or owner of same, to say nothing of expense incurred on account of such arrangement of sink.

My improved trap is very simple. It has ample straining-surface, but not so much as to become foul, giving it a more rapid discharge, and thereby allowing the waste-pipe to become thoroughly flushed at each discharge. It is very easily cleaned, as the water in running off carries the garbage with it, which is caught in the removable basket, giving no trouble till the basket is full, which is indicated by water running off slowly.

Grease, being lighter than water, will accumulate on the surface of water in trap, causing a semi-solid substance, and the heavier refuse settling to the bottom of basket and gradually filling said basket till the upper row of perforations in said basket is reached, which is some distance below the water-line of trap, thereby shutting off all escape for the grease, which, with the rest of garbage in basket, is removed by simply lifting out the basket and dumping its contents into the stove or range. The whole mass will be found to burn readily, owing to the grease contained in it.

Having thus described my invention, what I claim is—

1. The combination, with the sink, of the cylindrical trap-shell D, inner removable basket, C, the latter constructed with perforations below the water-line and having imperforate walls above said water-line, and suitable waste-connections, substantially as specified.

2. The combination, with the sink, of the cylindrical trap-shell D, inner removable basket, C, the latter constructed with perforations below the water-line and having imperforate walls above said water-line, perforated plate F, located in said shell beneath said basket, bolt $d$, passing through the center of said plate and the bottom of the shell, and suitable waste-connections, substantially as set forth.

In testimony whereof I affix my signature in presence of two witnesses.

MICHAEL WILLIAM SCANNELL.

Witnesses:
L. V. URTON,
ALEX. F. WALSH.